(12) United States Patent
Iwamoto

(10) Patent No.: US 9,071,066 B2
(45) Date of Patent: Jun. 30, 2015

(54) MEASUREMENT OF ENVIRONMENTAL IMPACT OF ELECTRONIC DEVICES

(75) Inventor: Takashi Iwamoto, Urayasu (JP)

(73) Assignee: Empire technology Development LLC, Wilmington, DE (US)

(*) Notice: Subject to any disclaimer, the term of this patent is extended or adjusted under 35 U.S.C. 154(b) by 678 days.

(21) Appl. No.: 12/645,085

(22) Filed: Dec. 22, 2009

(65) Prior Publication Data

US 2011/0153224 A1 Jun. 23, 2011

(51) Int. Cl.
*H02J 7/00* (2006.01)
*H01M 10/04* (2006.01)

(52) U.S. Cl.
CPC ............ *H02J 7/0055* (2013.01); *H01M 10/044* (2013.01)

(58) Field of Classification Search
CPC ..................................................... H02J 7/0055
USPC .................. 702/24, 22, 30, 57, 60, 61, 63, 64
See application file for complete search history.

(56) References Cited

U.S. PATENT DOCUMENTS

| 5,717,307 | A * | 2/1998 | Barkat et al. ................ 340/636.1 |
| 6,795,302 | B2 * | 9/2004 | Kluth et al. ................. 361/679.4 |
| 8,324,857 | B1 * | 12/2012 | Chang et al. ................... 320/101 |
| 8,581,550 | B2 * | 11/2013 | Lin et al. ........................ 320/123 |
| 2005/0231160 | A1 * | 10/2005 | Fischl ........................... 320/114 |
| 2007/0143636 | A1 * | 6/2007 | Bailey et al. ................... 713/300 |
| 2008/0094025 | A1 * | 4/2008 | Rosenblatt et al. ........... 320/101 |
| 2008/0281732 | A1 * | 11/2008 | Yamada .......................... 705/30 |
| 2009/0033276 | A1 * | 2/2009 | Ishii .............................. 320/103 |
| 2009/0096416 | A1 * | 4/2009 | Tonegawa et al. ............. 320/109 |
| 2009/0179493 | A1 * | 7/2009 | Yeh ................................. 307/64 |
| 2009/0184687 | A1 * | 7/2009 | Schroeder et al. ............ 320/162 |
| 2009/0254419 | A1 * | 10/2009 | Mochizuki et al. ............. 705/10 |

FOREIGN PATENT DOCUMENTS

GB 2446418 A * 8/2008

OTHER PUBLICATIONS

Bwea, "calculations for wind energy," (Jan. 2009).*
Wisniewski et al., "The Role of Renewable Energy in Carbon Dioxide Emission Reduction in Poland," Applied Energy (1995).*
http://www.violetta.com/english/index_e.html accessed online on Apr. 3, 2013.
http://www.violetta.com/english/products/products.html#vs12 accessed online on Apr. 3, 2013.

* cited by examiner

Primary Examiner — Hyun Park

(57) ABSTRACT

Devices, implementations and techniques for measuring the environment impact of electronic devices, such as $CO_2$ emission reduction by using alternative power sources for powering or charging electronic devices.

8 Claims, 4 Drawing Sheets

400 – A computer program product

402 – A signal bearing medium

404 – Machine-readable instructions for which, if executed by one or more processors, operatively enables a computing device to receive an identifier from a charge control unit; test if the charge control unit uses an alternative power source by checking the identifier; and measure energy from the charge control unit on condition of the charge control unit using an alternative power source 406 – A computer readable medium 408 – A recordable medium 410 – A communications medium

MEASUREMENT OF ENVIRONMENTAL IMPACT OF ELECTRONIC DEVICES

BACKGROUND

Unless otherwise indicated herein, the approaches described in this section are not prior art to the claims in this application and are not admitted to be prior art by inclusion in this section.

Carbon dioxide ("$CO_2$") is a greenhouse gas, which is believed to contribute to climate change. There are programs being proposed on international, national, regional, and/or local level that attempt to reduce or mitigate an ever-increasing amount of $CO_2$ being released into the earth's atmosphere from the use of non-renewable energy resources, such as fossil fuels. At some point, it is foreseeable that taxes or fees may be imposed on an individual or on a household level, wherein such taxes or fees may be reduced with a quantifiable demonstration of the use of renewal energy resources on a personal or household level, such as using personal/household solar, wind, or mechanical (manually cranked generators) energy sources.

Portable electronic devices, such as cell phones, digital music players, media players, personal data assistants, wireless web devices, headset devices, application specific devices, and the like, use considerable energy. For example, the number of mobile phone users is now in excess of 3 billion. Assuming the average power consumption of mobile phones is 2 W, more than 250 MW is consumed every hour in the world. Accordingly, this equates to approximately 120 tons of $CO_2$ (depending on the calculation method utilized) being emitted per hour into the earth's atmosphere if all of the energy used by these mobile phones is generated through the burning of fossil fuels. Thus, the use of renewable resources in the use and/or charging of these devices would help reduce the emission of $CO_2$ into the earth's atmosphere.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is a schematic illustrating an example computer program product that is arranged in accordance with the present disclosure.

DETAILED DESCRIPTION

Figure 1:
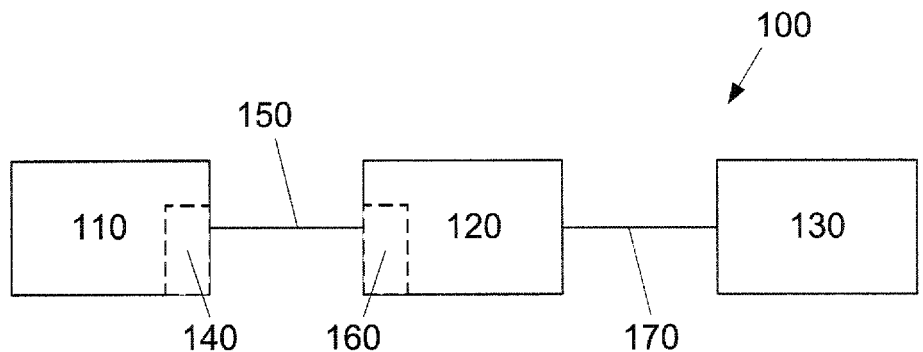
FIG. 1 is a schematic illustrating an electronic device configuration, according to one embodiment of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and/or computer program products related to the measurement of the environmental impact from powering or charging electronic devices. In one embodiment, the disclosure relates to methods, apparatus, systems and/or computer program products related to the measurement of $CO_2$ emission reduction when alternate power sources (e.g. "green" energy sources, such as solar and mechanical energy).

An embodiment of the subject matter described herein provides a device for measuring $CO_2$ emission reduction. The measuring device may include a receiver configured to receive an identifier from a charge control unit; a tester configured to test if the charge control unit uses an alternative power source by assessing the identifier; and an energy meter configured to measure the energy delivered to an electronic device on condition of the charge control unit using an alternative power source. The measuring device may further include a converter configured to calculate $CO_2$ emission reduction based at least in part on the measured energy being delivered to the electronic device.

The measured delivered energy and/or the calculated $CO_2$ emission reduction may be accumulated and stored in a memory of the measuring device. The data representing the accumulated delivered energy and/or $CO_2$ emission reduction may be used in a point program, such as mileage points or the like, so that a user can benefit or profit according to their recorded points. The measuring device may provide a user with quantifiable feedback on their contribution to the environment by using an alternative power source.

The device for measuring $CO_2$ emission reduction may be embedded into a mobile device, such as a mobile telephone, cellular telephone, a pager, a telephony equipped hand-held computer, a personal digital assistant (PDA), a digital music player, a media player, a wireless web device, a headset device, application specific devices, and the like, and other charging type of devices, including home appliances.

Although this disclosure discusses the subject matter of the present invention in term of $CO_2$ emission reduction (for example purposes), it will be understood to those skilled in the art that the subject matter may be applied to measuring any environmental impact that electronic devices may have.

FIG. 1 shows a schematic of an electronic device configuration 100 in accordance with at least one embodiment of the present disclosure, wherein an electronic device 110 is connected to a charge control unit 120 (such as a battery charger), which, in turn, may be connected to an energy source 130 through a power line 170. A measuring device 140 of the battery powered electronic device 110 is connected at least through an identifier signal line 150 to a charger type identifier 160 of the charge control unit 120. The energy source 130 may be an alternate power source, which may include, but are not limited to, solar cells, fuel cells, mechanical power generators, such as wind power or hand-cranking chargers, and the like.

Figure 2:
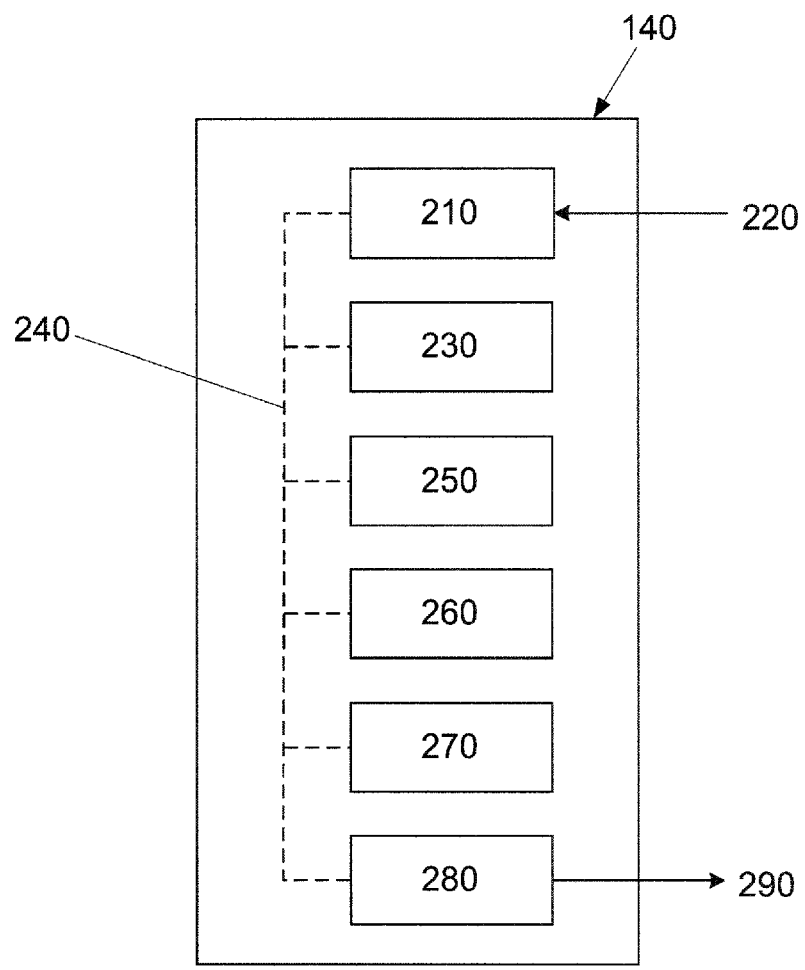
FIG. 2 is a schematic illustrating a measuring device, according to one embodiment of the present disclosure.

As shown in FIG. 2, the measuring device 140 may comprise a receiver 210 which may receive an identifier 220 through the identifier signal line 150 (see FIG. 1) from the charge type identifier 160 of charge control unit 120 (see FIG. 1). The identifier 220 may indicate an energy type being delivered through the charge control unit 120 from the energy source 130 (see FIG. 1), i.e. whether or not the charge control unit 120 is drawing energy from an alternative power source. In another embodiment, the identifier 220 may be a product number given by a manufacture of charge control units 120.

The identifier 220 may be provided by the charge control unit 120 through a data bus on the charge control circuit of a battery, in cases where it is operatively connected to the electronic device 110, which may include the measuring device 140. The identifier 220 may be stored in a control integrated circuit or a non-volatile memory of the charge control unit 120.

As further shown in FIG. 2, the measuring device 140 may further include a tester 230 which may be in communication with the receiver 210 through a date data bus 240. The tester 230 may be configured to test if the charge control unit 120 (see FIG. 1) is utilizing an alternative power source. This test may be done by the tester 230 assessing the identifier 220 received by the receiver 210 from the charge control unit 120 (see FIG. 1).

For example, the identifier 220 may be a flag, which is "ON" in cases where the charge control unit 120 uses an alternative power source. In this case, the tester 230 may decide that the charge control unit 120 uses the alternative power source in cases where the flag is ON. In another example, the identifier may be a product number given by a manufacture of the charge control unit 120. In this case, the measuring device 140 may include a table, such as Table 1, which associates a product number with a charger type. Then, the tester 230 may decide if the charge control unit 120 uses an alternative power source by referring this table. In Table 1, a Type 1 would be an alternative power source and a Type 0 would not be an alternative power source.

TABLE 1

| Product | Type | $CO_2$ emission coefficient (kg $CO_2$) |
|---------|------|-----------------------------------------|
| A0001   | 1    | 0.555                                   |
| A0002   | 0    | N/A                                     |
| B0005   | 1    | 0.353                                   |

As still further shown in FIG. 2, the measuring device 140 may still further include an energy meter 250, which is configured to measure energy delivered from the charge control unit 120 to the electronic device 110 (see FIG. 1). The energy meter 250 may be connected to other components of the measuring device 140 through the data bus 240. The energy meter 250 may be activated in cases where the charge control unit 120 (see FIG. 1) uses an alternative power source. The energy delivered to the electronic device 110 (see FIG. 1) may be expressed in watt-hours.

As further shown in FIG. 2, the measuring device 140 may further include a converter 260, which is configured to calculate $CO_2$ emission reduction based at least in part on the charged energy measured by the energy meter 250. The converter 260 may be connected to other components of the measuring device 140 through the data bus 240. The $CO_2$ emission reduction may be calculated by multiplying $CO_2$ emission coefficient (see Table 1) by the amount of energy deliver delivered to the electronic device 110 (see FIG. 1). For example, when 5.6 watt-hours are delivered and the corresponding $CO_2$ emission coefficient is 0.555, the $CO_2$ emission reduction will be 3.108 kg $CO_2$.

The $CO_2$ emission coefficient may be stored in a memory or storage 270 of the measuring device 140. The memory 270 may be any non-volatile storage media, including but not limited to memory devices, such as read-only memory, EEPROM, flash memory, and the like; and storage devices, such magnetic storage devices, optical storage devices, CD-ROM, digital versatile disks, and the like. The memory 270 may be connected to other components of the measuring device 140 through the data bus 240. Furthermore, the $CO_2$ emission coefficient may be stored in the memory 270, wherein the coefficient is associated with the identifier 220 of the control charge unit 120, since the $CO_2$ emission coefficient may vary depending on a charger, a manufacture, a country, etc. (see Table 1). This embodiment may enable more accurate calculation of $CO_2$ emission reduction.

The memory 270 may also be used to accumulate and store the measurement of the delivered energy measured by the energy meter 250 and/or the $CO_2$ emission reduction calculated by the converter 260 above. Furthermore, the memory 270 may store the table, which associates a product number with a charger type, which was described above for Table 1.

The measuring device 140 may further include an output unit 280, which is configured to output data 290 representing the energy use and/or $CO_2$ emission reduction. The output unit 280 may be connected to other components of the measuring device 140 through the data bus 240. The output unit 280 may transfer such data 290 to a display screen (not shown) on the electronic device 110 (see FIG. 1), which may include the disclosed measuring device 140. It is also understood that the output unit 280 itself may be configured to the measure energy and/or $CO_2$ emission reduction data.

For another example, the output unit 280 may send (upload) such data 290 to a server or other systems, such as a data bank or the like via a network for further services or the other purposes (not shown). An example of such services may be a point program, under which the users may trade $CO_2$ credits and can benefit from their saved $CO_2$ units.

Figure 3:
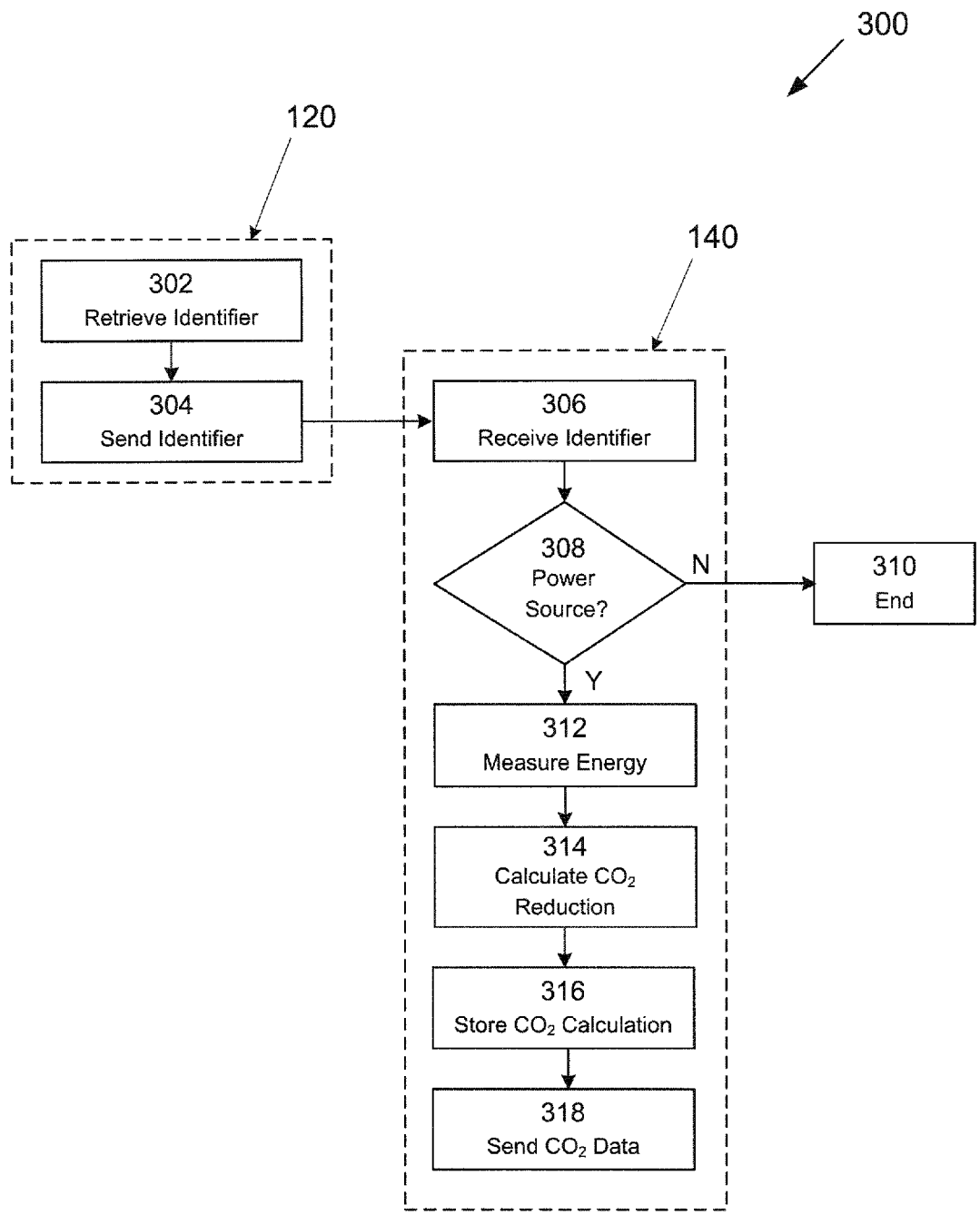
FIG. 3 is a block diagram illustrating a process flow, according to one embodiment of the present disclosure.

FIG. 3 shows an example of a process flow in accordance with at least some embodiments of the present disclosure. A process 300, and other processes described herein, set forth various functional blocks or actions that may be described as processing steps, functional operations, events and/or acts, etc., which may be performed by hardware, software, and/or firmware. Those skilled in the art, in light of the present disclosure, will recognize that numerous alternatives to the functional blocks shown in FIG. 3 may be practiced in various implementations. For example, although the process 300, as shown in FIG. 3, comprises one particular order of blocks or actions, the order in which these blocks or actions are presented does not necessarily limit claimed subject matter to any particular order. Likewise, intervening actions not shown in FIG. 3 and/or additional actions not shown in FIG. 3 may be employed and/or some of the actions shown in FIG. 3 may be eliminated, without departing from the scope of claimed subject matter. Thus, the process 300 may include one or more of operation blocks 302, 304, 306, 308, 310, 312, 314, 316, and/or 318.

The process 300 may start when the charge control unit 120 is connected to the electronic device 110, which includes the measuring device 140, as shown in FIG. 1. Referring to FIG. 3, block 302 may comprise retrieving an identifier to identify the type of energy being used, such as by the charge control unit 120 as discussed herein. Block 304 may comprise sending the identifier from the charge control unit 120 to the measuring device 140, which receives the identifier in block 306. In block 308, whether an alternative energy being used is determined from the identifier passed from block 306, such as by the tester of the measuring device discussed herein. If the block 308 determines that an alternative energy is not being used ("N"), then the process terminates, i.e. block 310, and the battery may be charged as usual. If the block 308 determines that an alternative energy is being used ("Y"), then the process proceeds to block 312. Block 312 measures the amount of alternative energy being used, such as with the energy meter discussed herein. Block 314 receives the alternative energy measurement information from block 312 and calculates the $CO_2$ emission reduction by multiplying a $CO_2$ emission coefficient corresponding to the charge control unit 120 by the measured amount of energy used. The calculated $CO_2$ emission reduction in block 314 may be passed to block 316 wherein the data may be accumulated and stored, such as in the memory discussed herein. The accumulated and stored data from block 316 may be passed to block 318, which may send data representing the accumulated $CO_2$ emission reduction, in response to user's operation on the measuring device 140 to do so, such as in the output unit discussed herein.

FIG. 4 illustrates an example computer program product 400 that is arranged in accordance with the present disclosure. Program product 400 may include a signal bearing medium 402. Signal bearing medium 402 may include one or more machine-readable instructions 404, which, if executed by one or more processors, may operatively enable a computing device to provide the functionality described above with respect to FIG. 4; in specific, receive an identifier from a charge control unit, test if the charge control unit uses an alternative power source by assessing the identifier, and measure energy from the charge control unit on condition of the charge control unit using an alternative power source. Thus, for example, referring to FIG. 2, receiver 210, tester 230, energy meter 250, converter 260, and/or output unit 280 may undertake one or more of the actions shown in FIG. 3 in response to instructions 404 conveyed by medium 402.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.).

Figure 5:
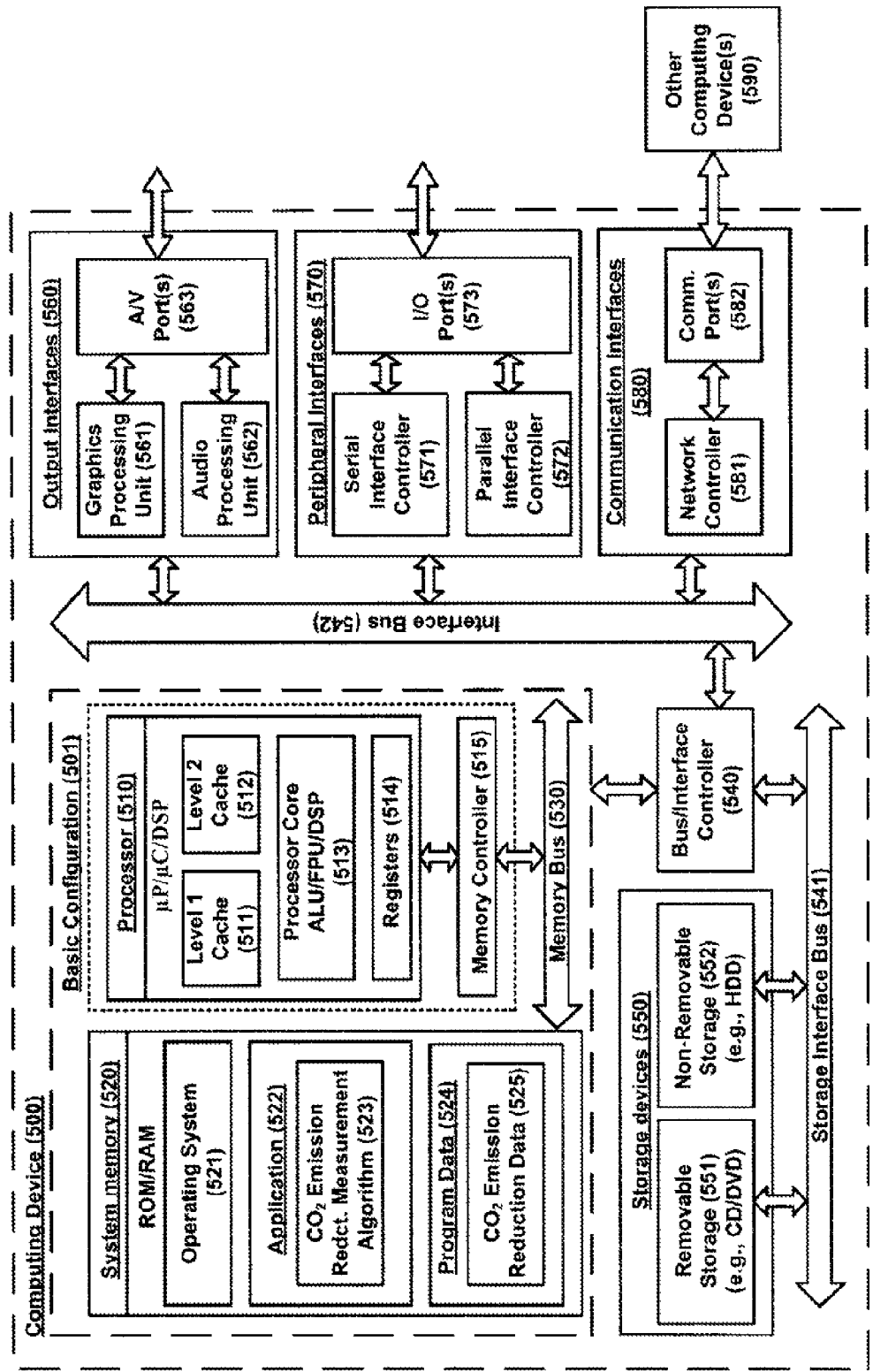
FIG. 5 is a schematic illustrating an exemplary computing device, according to one embodiment of the present disclosure.

FIG. 5 is a block diagram illustrating an exemplary computing device 500 that is arranged in accordance with the present disclosure. In one example configuration 501, computing device 500 may include one or more processors 510 and system memory 520. A memory bus 530 can be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 can include one or more levels of caching, such as a level one (L1) cache 511 and a level two (L2) cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include $CO_2$ emission reduction measuring algorithm 523 in a measuring device (FIG. 1) that is arranged to perform the functions and/or operations as described herein including the functional blocks and/or operations described with respect to process 300 of FIG. 3. Program Data 524 may include $CO_2$ emission reduction data 525 outputted by $CO_2$ emission reduction measuring algorithm 523. In some example embodiments, application 522 may be arranged to operate with program data 524 on an operating system 521 such that implementations of mobile sampling may be provided as described herein. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more NV ports 563. Example peripheral interfaces 570 may include a serial interface controller 571 and/or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A mobile device to measure an environmental impact of charging the mobile device comprising:
    a receiver of the mobile device configured to receive an identifier from a charge control unit, wherein the identifier indicates whether or not the charge control unit is drawing energy from an alternative renewable energy power source, wherein the mobile device is configured to be coupled to the charge control unit to charge the mobile device;
    a tester of the mobile device configured to distinguish whether or not the charge control unit is drawing energy from an alternative renewable energy power source based on an assessment of the identifier to determine if the charge control unit uses an alternative renewable energy power source, wherein the identifier comprises a flag which if "ON" indicates that the charge control unit is using alternative renewable energy power to charge the mobile device;

an energy meter of the mobile device configured to measure energy from the charge control unit responsive to a determination by the tester that the charge control unit is using alternative renewable energy to charge the mobile device;

a converter of the mobile device configured to calculate a $CO_2$ emission reduction based at least in part on the measured energy, wherein the converter is configured to calculate the $CO_2$ emission reduction based at least in part on multiplying a stored $CO_2$ emission coefficient by the measured energy and wherein the stored $CO_2$ emission coefficient is associated with the identifier to associate the $CO_2$ emission coefficient with use of the alternative renewable energy power source, wherein the converter is configured to calculate the $CO_2$ emission reduction if the mobile device detects a connection to an alternative renewable energy source;

an output unit of the mobile device configured to send data that represents the measured energy or the $CO_2$ emission reduction or a combination thereof to a remote server to be converted to points that represent accumulated measured energy or accumulated $CO_2$ emission reduction or a combination thereof to be used in a user point program to enable a user to benefit based on the points; and a display on the mobile device configured to display data to represent the measured energy or the $CO_2$ emission reduction or a combination thereof.

2. The mobile device of claim 1, further comprising:
a memory of the mobile device configured to store the calculated $CO_2$ emission reduction.

3. The mobile device of claim 1, further comprising:
a memory of the mobile device configured to store the measured energy.

4. A method for measuring the environmental impact of charging a mobile device, comprising:
coupling a mobile device to a charge control unit to charge the mobile device;
receiving, at the mobile device, an identifier from the charge control unit, wherein the identifier indicates whether or not the charge control unit is drawing energy from an alternative renewable energy power source;
testing, at the mobile device, to distinguish whether or not the charge control unit is drawing energy from an alternative renewable energy power by assessing the identifier, wherein the identifier comprises a flag which if "ON" indicates that the charge control unit is using alternative renewable energy power to charge the mobile device;
measuring energy delivered from the charge control unit responsive to a determination via the testing that the charge control unit is using alternative renewable energy to charge the mobile device;
calculating, at the mobile device, a $CO_2$ emission reduction based at least in part on the measured energy to measure the $CO_2$ emission reduction if the mobile device detects a connection to the alternative renewable energy source, wherein calculating the $CO_2$ emission reduction comprises multiplying a stored $CO_2$ emission coefficient by the measured energy, wherein the stored $CO_2$ emission coefficient is associated with the identifier to associate the $CO_2$ emission coefficient with use of the alternative renewable energy power source;

sending, from the mobile device, data configured to represent the measured energy or the $CO_2$ emission reduction or a combination thereof to a remote server to be converted to points to represent accumulated measured energy or accumulated $CO_2$ emission reduction or a combination thereof to be awarded in a user point program to enable a user to benefit based on the points; and displaying data configured to represent the measured energy or the $CO_2$ emission reduction or a combination thereof on the mobile device.

5. The method of claim 4, further comprising:
storing, at the mobile device, data configured to represent the measured energy or the calculated $CO_2$ emission reduction, or a combination thereof.

6. The method of claim 5, further comprising:
outputting data configured to represent the measured energy or the calculated $CO_2$ emission reduction, or a combination thereof.

7. The method of claim 4, further comprising: outputting data of the measured energy.

8. An article comprising:
a non-transitory signal bearing medium comprising machine-readable instructions stored thereon, which, if executed by one or more processors, operatively enable a mobile device to:
receive an identifier from a charge control unit, wherein the mobile device is configured to be coupled to the charge control unit to charge the mobile device, wherein the identifier indicates whether or not the charge control unit is drawing energy from an alternative renewable energy power source;
assess the identifier to distinguish whether or not the charge control unit is drawing energy from an alternative renewable energy power source, wherein the identifier comprises a flag which if "ON" indicates that the charge control unit is using alternative renewable energy power to charge the mobile device;
measure energy from the charge control unit on condition of use of an alternative renewable energy source by the charge control to charge the mobile device;
calculate a $CO_2$ emission reduction based at least in part on the measured energy to measure the $CO_2$ emission reduction if the mobile device detects a connection to the alternative renewable energy source, wherein calculating the $CO_2$ emission reduction comprises multiplying a stored $CO_2$ emission coefficient by the measured energy, wherein the stored $CO_2$ emission coefficient is associated with the identifier to associate the $CO_2$ emission coefficient with use of the alternative renewable energy power source;
display data configured to represent the measured energy and the $CO_2$ emission reduction on the mobile device; and
send the data configured to represent the measured energy or the $CO_2$ emission reduction or a combination thereof to a remote server to be converted to points that represent accumulated measured energy or accumulated $CO_2$ emission reduction or a combination thereof to be awarded in a user point program to enable a user to benefit based on the points.

* * * * *

UNITED STATES PATENT AND TRADEMARK OFFICE
CERTIFICATE OF CORRECTION

PATENT NO.         : 9,071,066 B2
APPLICATION NO.    : 12/645085
DATED              : June 30, 2015
INVENTOR(S)        : Iwamoto Page 1 of 1

It is certified that error appears in the above-identified patent and that said Letters Patent is hereby corrected as shown below:

Specification

In Column 3, Line 29, delete "date data" and insert -- data --, therefor.

In Column 4, Line 7, delete "deliver delivered" and insert -- delivered --, therefor.

In Column 6, Line 67, delete "NV ports 563." and insert -- A/V ports 563. --, therefor.

Signed and Sealed this
Twenty-fourth Day of November, 2015

Michelle K. Lee
*Director of the United States Patent and Trademark Office*